(12) United States Patent
Hermansen et al.

(10) Patent No.: US 6,851,189 B2
(45) Date of Patent: Feb. 8, 2005

(54) METHOD OF FABRICATING A CLIPLESS BICYCLE PEDAL

(76) Inventors: Frank Hermansen, 276 Canyon Acres Dr., Laguna Beach, CA (US) 92651; Carl Winefordner, 590 Park Ave., Laguna Beach, CA (US) 92651

( * ) Notice: Subject to any disclaimer, the term of this patent is extended or adjusted under 35 U.S.C. 154(b) by 53 days.

(21) Appl. No.: 10/375,243

(22) Filed: Feb. 27, 2003

(65) Prior Publication Data

US 2004/0168542 A1 Sep. 2, 2004

(51) Int. Cl.[7] .......................... B21D 53/88; B21D 39/02
(52) U.S. Cl. ...................... 29/897.2; 29/46.3
(58) Field of Search ........................ 29/897.2, 456, 29/463, 428; 72/379.2, 404, 369; 74/594.6, 594.4

(56) References Cited

U.S. PATENT DOCUMENTS 4,860,570 A * 8/1989 Perrault et al. ............ 72/379.2
5,203,071 A * 4/1993 Niemela ....................... 29/596
5,419,043 A * 5/1995 Laue ........................... 29/897.2

* cited by examiner

Primary Examiner—John C. Hong
(74) Attorney, Agent, or Firm—Leonard Tachner

(57) ABSTRACT

A clipless mechanism for a four-sided clipless bicycle pedal is made by a stamping and welding process. The stamping is preferably a progressive stamping process. The stamped parts include two components, an inner wing and an outer wing. The two stamped components are generally similar in shape to each other, but the inner wing fits within the outer wing. Each part is first stamped as a flat pattern by a progressive die. Each part then has radii stamped into the edges by the second station of the progressive die. Next, each part is partially folded by the third station of the progressive die. Then each part is folded completely by the fourth station of the progressive die. The actual number of steps may vary depending upon the material chosen, the thickness of the material and the design of the stamping tool. Then each part is welded closed and the resulting rectangular wings are assembled in juxtaposed orthogonal relation to provide four shoe cleat engaging receptacles.

9 Claims, 9 Drawing Sheets

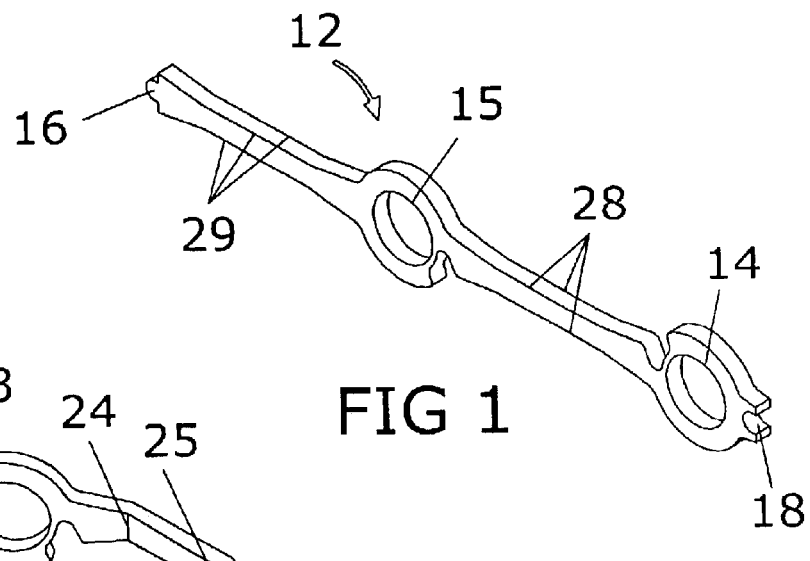
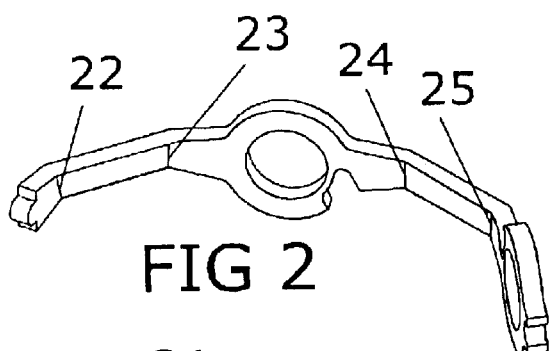
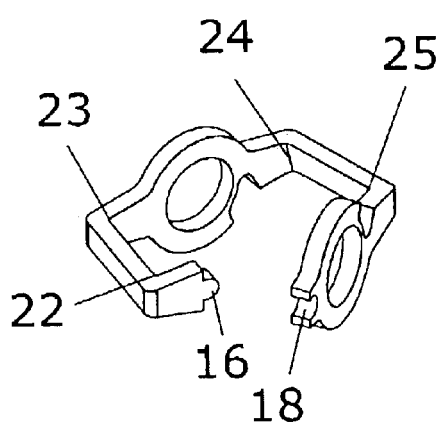
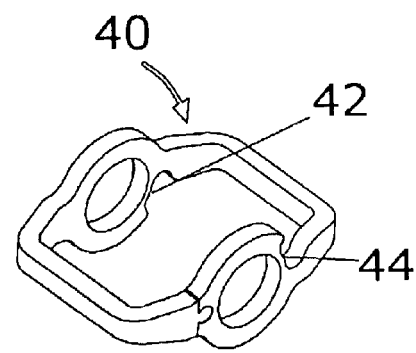
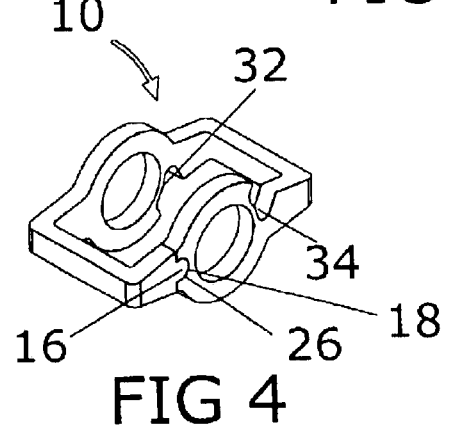

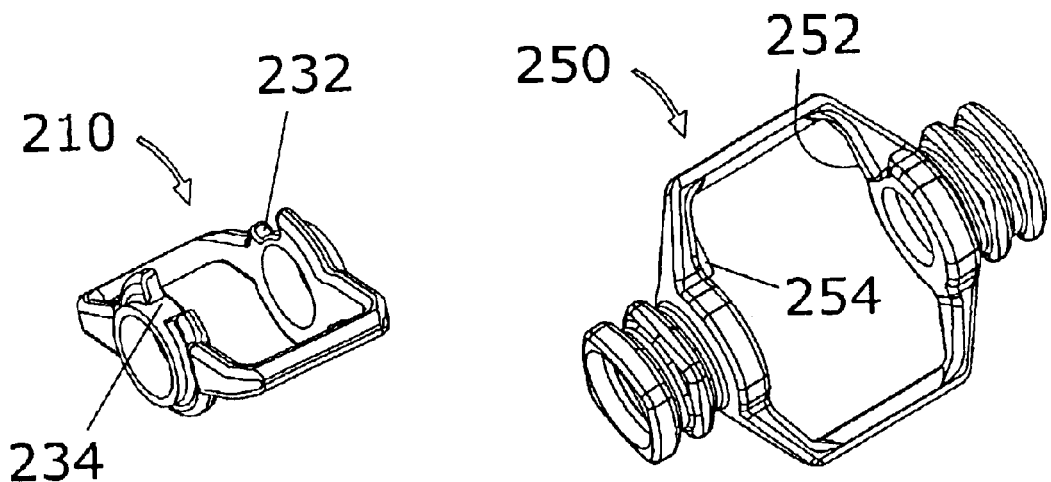
FIG 18
(Prior Art)
FIG 19
(Prior Art)
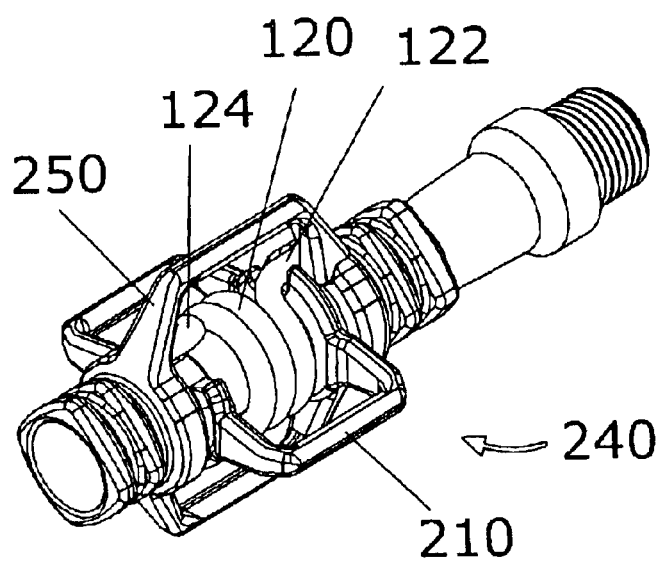
FIG 20
(Prior Art)

METHOD OF FABRICATING A CLIPLESS BICYCLE PEDAL

BACKGROUND OF THE INVENTION

1. Field of the Invention

This invention relates generally to four-sided clipless bicycle pedals and more particularly to a method of manufacturing such pedals.

2. Background Art

Originally, pedals were simply platforms to push down on. Then came pedals with toe clips, which were essentially cages on top of the pedals that the rider's shoes fit into. Then came "clipless" pedals, which securely held rider's shoes to the pedals without the toe clip (hence "clipless").

A number of clipless pedal designs have been made commercially available. A clipless pedal is a pedal that clamps to the rider's shoe via a cleat mounted to the bottom of the rider's shoe. Typically, to unclip the rider twists his foot outwards. The first clipless pedals were single side entry because they had latch and release mechanisms on only one side of the pedal. The next clipless pedals were double side entry because they had latch and release mechanisms on opposite sides of the pedal. The advantage of double side entry is that it is easier for the rider to clip into the pedal without looking. The disadvantage is that double side entry pedals are generally more complex and heavier than single side entry pedals. The next clipless pedal was four-sided, and had the advantage of making it even easier for the rider to clip into the pedal, improved performance in mud, lighter weight, and greater simplicity. The disadvantage of the four-sided pedal is a relatively high manufacturing cost.

A four-sided pedal is disclosed in U.S. Pat. No. 6,205,885 to the present inventors. Even with its relatively high manufacturing cost, this pedal has achieved significant success in the marketplace. However, the success will always be limited by the cost. For example, there are perhaps ten times more pedals sold at US$60 retail than at US$120 retail. The technology of the four-sided pedals is extremely good and well proven in the market, but the cost of manufacture is simply too high for selling to the largest segment of the market. That is why it is important to be able to manufacture the clipping mechanism in a more efficient manner.

The '885 patent describes a four-sided pedal that is made using bent wire/machining/welding processes for the clipping mechanism. It describes other methods of manufacture such as forging or machining. The problem with using bent wire/machining/welding processes for the clipping mechanism is that the machined parts are somewhat complex and it is difficult to accurately align all the parts during the welding process.

Forging the clipping mechanism would be very expensive because there are still a great number of steps in the process and the flash is difficult to trim. It is especially difficult to trim the flash because the parts must remain straight or else they will not function properly and it takes a large force for trimming.

Machining the clipping mechanism as described in the '885 patent is also expensive because of the protrusions and because there is multi-axis machining required. Also, the spring shown in the preferred embodiment of the '885 patent is difficult to make, because the wire is bent back over itself.

The clipping mechanism of the actual four-sided clipless pedals currently marketed under the '885 patent is made using investment casting (also called lost wax casting). Investment casting works extremely well functionally for making these parts, but is so labor intensive that it is expensive. Also, it is difficult to investment cast these parts straight because the clipping bars are relatively thin and especially fragile when still in their wax state. The '885 pedal currently marketed has two investment cast components. Therefore, a pair of pedals requires four investment cast components. These four components can easily cost more than the rest of the pedal components combined.

Another problem with investment casting the clipping mechanism of the pedal is that because there are so many steps to the process, the lead time for making parts is long. Typical lead time is almost two months for production quantities. This can cause delivery problems if demand exceeds expectations. Also, capacity can be a problem because most casting companies have a relatively low daily output. Investment casting is normally a process used for low volume production.

As discussed above, investment casting is expensive because it involves so many labor intensive steps. Specifically, first a wax positive is injection molded including a sprue and small protrusions (that will become vents). Then several wax positives are joined to a wax "tree" by the sprue. Then this tree is repeatedly dipped into a wet plaster-like slurry that adds layer after layer of plaster. Then the wax is melted away in a high temperature kiln. At this stage, the plaster is a one-time use mold. Then the mold is placed into the investment cast machine and molten metal is poured into the mold. (For titanium, a special investment cast machine is used that keeps the molten titanium in a vacuum.) Then the plaster mold is dissolved to free the metal "tree". If the metal used is hardenable such as the 17-4ph stainless steel used for most of the marketed pedals currently made under the '885 patent, then each part should be annealed, or else they are too hard to easily cut or machine. Then each part is cut off from the "tree". Then each part has the sprue cut away more completely. Then each part is machined and finished. It is no surprise that investment casting is so expensive.

Die casting is an inexpensive process that in theory could be used for making the clipping mechanism. Unfortunately, die casting can normally only be used to cast weaker metals such as zinc, aluminum and magnesium. These metals can't be reasonably used for the bars primarily because there is a size limitation. If the bars are made big enough so that zinc or aluminum or magnesium are strong enough, then the profile of the cleat becomes bigger, which causes the cleat to protrude too far from the bottom of the shoe to allow easy walking. Also, it would increase the distance from the bottom of the rider's foot to the center of the axle (called stack height). It is advantageous to have the lowest stack height possible. Also, die cast metals such as zinc, aluminum and magnesium are so soft that they would wear more quickly, especially where the cleat rubs against the clipping mechanism. Therefore, steel or titanium or other high strength materials should be used for the clipping mechanism.

There is a process known as Metal Injection Molding (MIM) that could conceivably be used to make the clipping mechanism. MIM is, essentially, a sophisticated die casting process that can be used to make steel and other hard metal components. A mixture of powdered metal and a binder material is injection molded into an over-sized part. Then most of the binders are removed during a thermal debinding process. Then the remaining binders are removed in a high-temperature sintering furnace. During the sintering process, the parts shrink about 20%, and metal powder particles fuse together. Unfortunately, MIM, while less labor intensive than investment casting, requires expensive tooling, expensive material preparation, expensive equipment, and several steps. The piece cost is similar to investment casting. Therefore, it would still be a relatively expensive process to use for making the clipless mechanism.

In order to achieve the goal of participating in the lower priced category, the price of the clipping mechanism components should be reduced not by a few percent, but by a factor of 5 or 10.

SUMMARY OF THE INVENTION

An object of the present invention is to provide an inexpensive clipless mechanism of a four-sided clipless pedal for bicycles.

Another object of the present invention is to provide an inexpensive method for making the clipless mechanism of a four-sided clipless pedal for bicycles, which can be made in high quantities with a short lead time.

Another object of the present invention is to provide an inexpensive method for making the clipless mechanism of a four-sided clipless pedal for bicycles, which can work with multiple configurations of the four-sided clipless pedal including plain and platform versions. In this way, tooling and inventory can be minimized and simplified.

Still another object of the present invention is to provide an inexpensive method for making the clipless mechanism of a four-sided clipless pedal for bicycles, which pedal can function with the same cleat as four-sided clipless pedals using more expensive manufacturing methods. It is important to operate with the same cleat because many bicyclists are already using cleats for their four-sided clipless bicycle pedals made using the '885 patent with a high cost investment cast clipless mechanism. Most cyclists that use clipless bicycle pedals have two or more bicycles and standardization of their cleats is important. For example, the cyclist may want to use one pair of shoes with cleats to work with all the pedals on their bicycles. Also, once a cleat becomes a standard in the market, it is more convenient for people to borrow or rent bicycles with clipless pedals. Also, some riders have more than one pair of shoes to use depending on riding conditions and it is desirable to be able to use the same cleat on all their pairs of shoes.

Yet another object of the present invention is to provide an inexpensive method for making the clipless mechanism of a four-sided clipless pedal for bicycles, which pedal retains the riding performance advantages of more expensive four-sided clipless pedals that are already commercially available. Specifically, the four-sided clipless pedal must still be able to engage the cleat, be sturdy enough to meet the rigorous demands of mountain biking and yet be easy to use. It should be easy to engage and disengage and be resistant to effects of dirt or debris which might otherwise damage or incapacitate a locking mechanism. It should be small enough to be substantially retained within the recessed area in the soles of commercially-available mountain bicycle shoes so that it is generally protected from impact and does not interfere with walking. It should minimize the distance from bottom of the cycling shoe to the centerline of the pedal to lower the rider's center of gravity and make pedaling more stable, minimize the distance from the centerline of the pedal to the bottom of the pedal for improved ground clearance while pedaling. It should also have easy maintenance including easy disassembly and reassembly, be relatively light in weight and be highly resistant to clogging with mud.

The foregoing and other objects are attained, according to the present invention, by a clipless mechanism made by a stamping and welding process. For efficiency and capacity reasons, the stamping is preferably a progressive stamping process. While there are one-sided and two-sided clipless pedals that have clipping mechanisms that are in part made via a stamping process, it is not at all obvious how to apply this process to making the clipping mechanism components of a four-sided clipless pedal. This is because the components of the four-sided clipping mechanism have a fundamentally different shape than one-sided and two-sided clipless pedals and the three-dimensional shapes do not seem to lend themselves to being stamped. Also, it is not at all obvious how to stamp parts so that a spring can bias the clipless mechanism correctly for all four sides, as can be done with investment cast parts.

Stamping in general, and progressive stamping in particular, is an extremely fast and inexpensive process. The clipping mechanism parts as described herein can be easily progressively stamped at a rate of 4 per second (14,400 per hour) using one progressive stamping tool. By using an automated welding fixture, it is also easy and fast to reliably weld the parts. For a four-sided pedal version without an external platform, there are also two simple screw machined parts that are welded to one of the two clipping components. For four-sided pedal versions with a platform style, the parts do not require this additional step.

The stamped parts include two components, an inner wing and an outer wing. As designed, the two stamped components are generally similar in shape to each other, but the inner wing fits within the outer wing. Each part is first stamped as a flat pattern by the progressive die. Next, each part has any necessary radii stamped into the edges by the second station of the progressive die. Next, each part is partially folded by the third station of the progressive die. Next, each part is folded completely by the fourth station of the progressive die. The actual number of steps may vary depending upon the material chosen, the thickness of the material and the design of the stamping tool. Next, each part is welded closed. In order to increase the strength of the weld, the surface area of the surface to be welded has a puzzle piece-like contour that increases surface area. If the pedal model has a platform, then the outer and inner wings are complete unless plating is desired. If the pedal model does not have a platform, then a screw machined part is welded to each end of the outer wing and then the outer and inner wings are complete unless plating is desired.

By using the above method of manufacture, the profile of the pedal can remain the same as pedals made using more expensive manufacturing methods. This means that the same cleat that works with the more expensive pedals will work with the less expensive pedals. The above method of manufacturing the clipping mechanism allows the four-sided pedal to be made far more economically than other manufacturing methods and dramatically reduces the overall cost of the pedal. This allows the pedal to sell in a far larger market. Also, by using the above method of manufacture, the same stamped components can be used for different models of four-sided pedals such as those with and without platforms. The inventive features hereof although intended primarily for use in bicycle pedals, are also applicable to other cleat receiving apparatus such as snow board bindings and the like.

BRIEF DESCRIPTION OF THE DRAWINGS

The aforementioned objects and advantages of the present invention, as well as additional objects and advantages thereof will be more fully understood hereinafter, as a result of a detailed description of preferred embodiments thereof, when taken in conjunction with the following drawings in which:

FIG. 1 is a perspective view of a stamped flat pattern of the inner wing component of the low cost four-sided clipping mechanism of a clipless bicycle pedal;

FIG. 2 is a perspective view of the stamped pattern partially bent;

FIG. 3 is a perspective view of the stamped pattern bent to almost its final configuration;

FIG. 4 is a perspective view of the stamped pattern bent completely and welded closed to form an inner wing;

FIG. 5 is a perspective view of a stamped, bent and welded outer wing component of the low cost four-sided clipping mechanism of a clipless bicycle pedal;

FIG. 18 is a perspective view of a prior art investment cast inner wing of a four-sided clipless bicycle pedal.

FIG. 19 is a perspective view of a prior art investment cast outer wing of a four-sided clipless bicycle pedal.

FIG. 20 is a perspective view of a prior art four-sided clipless bicycle pedal made with the inner and outer wings from FIGS. 18 and 19, respectively.

DETAILED DESCRIPTION OF PREFERRED EMBODIMENT

Figure 6:
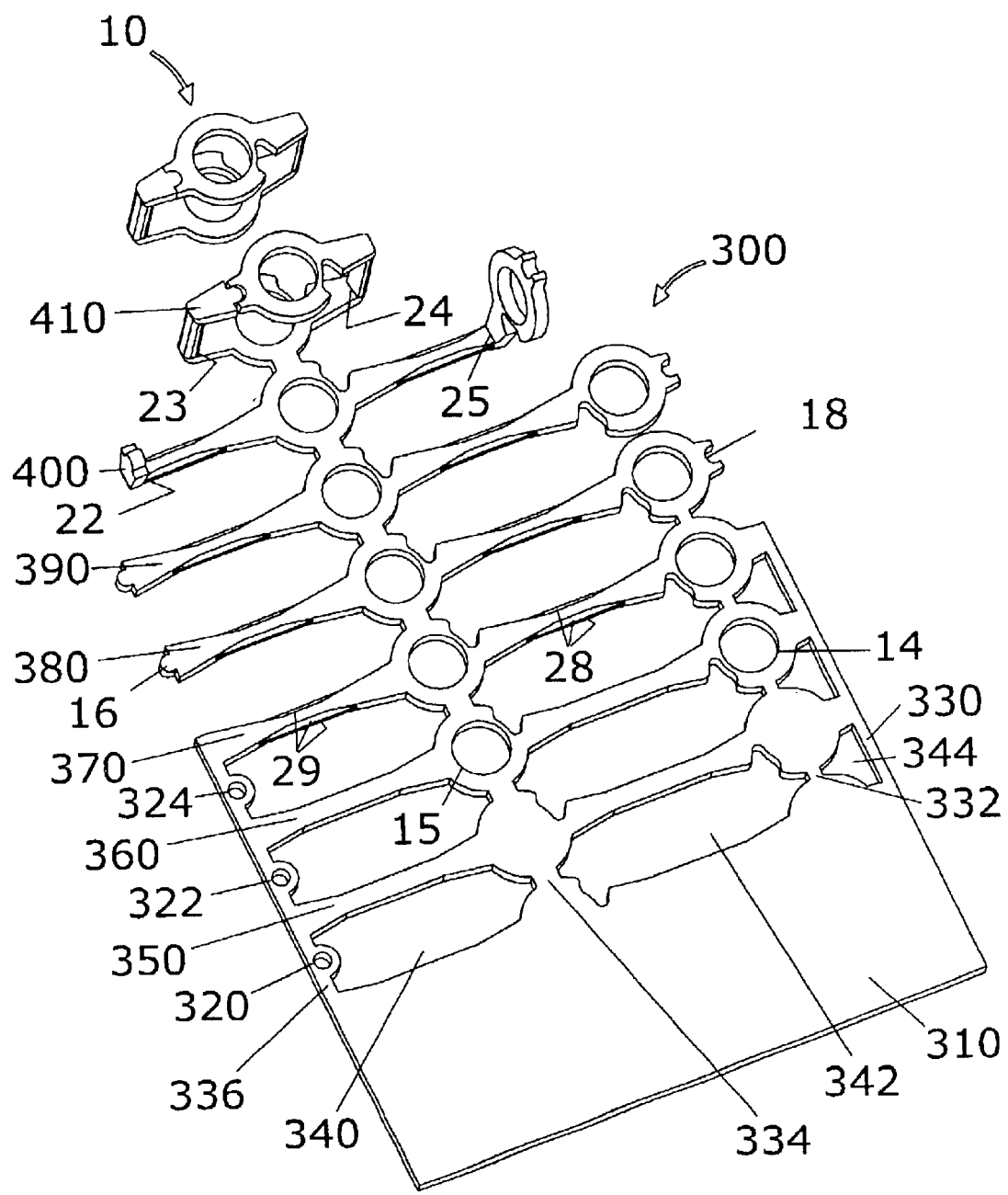
FIG. 6 is a perspective view of the progressive stamping stages plate to form an inner wing.

The preferred embodiment of the present invention may be understood by referring to FIGS. 1–20. It will be seen that a low cost four-sided clipless pedal mechanism is comprised primarily of two stamped and welded components: an inner wing 10 and outer wing 40. Inner wing 10 and outer wing 40 are preferably stamped using a progressive stamping method in order to obtain their three dimensional shapes and then welded closed. FIGS. 1–4 show a conceptual stamping method as a four step process, but the number of stamping stations could vary greatly depending on the actual design of the stamping tool and the thickness and properties of the material chosen. For example, the process could actually be done with ten steps instead of four. In a specific example, a progressive stamping stages plate 300 is shown to form an inner wing 10 in seven stages 350, 360, 370, 380, 390, 400, and 410. Progressive stamping is an extremely cost effective method of stamping inner wing 10 and outer wing 40. A small platform clipless pedal 170 is comprised of the inner wing 10, the outer wing 40, a spring 120 and a sleeve 100 that rotates within a platform 90. Spring 120 biases inner wing 10 and outer wing 40 to be approximately orthogonal to each other, but allows resistant angular movement between inner wing 10 and outer wing 40 during clipping in and out. A bushing 110 is pressed into the inboard end of the platform 90 and a cartridge ball bearing 130 fits into the outboard end of the platform 90. The platform 90 rotates around a spindle 80. A nut 140 retains spindle 80 within platform 90. An end plug 150 screws into platform 90 to securely hold in position the outer race of cartridge bearing 130, to reduce axial play between spindle 80 and platform 90. Once assembled, inner wing 10, outer wing 40, spring 120 and sleeve 100 become a low cost four-sided clipless mechanism 270 and rotate within platform 90 so that any of four sides of the mechanism are available for cleat 260 to clip into. Cleat 260 is attached to the bottom of a cycling shoe and will clip into pedal 170 by either stepping down into the clipping mechanism, or by sliding the shoe forwards or backwards over platform 90, causing the inner wing 10/outer wing 40/spring 120/sleeve 100 to rotate about one-quarter turn. The same mechanism 270 fits into a larger platform 190 to form a dramatically bigger platform pedal 200. As with small platform pedal 170, mechanism 270 is free to rotate within large platform 190 to allow four-sided cleat engagement.

For a non-platform pedal configuration 180, the outer wing 50 is comprised of two screw-machined parts welded to the outer wing 40. Non-platform pedal 180 is comprised of an inner wing 10, the outer wing 50, a spring 120, and a sleeve 100. Spring 120 biases inner wing 10 and outer wing 50 to be approximately orthogonal to each other, but allows resistant angular movement between inner wing 10 and outer wing 50 during clipping in and out A bushing 110 is pressed into the inboard end of the outer wing 50 and a cartridge ball bearing 130 fits into the outboard end of outer wing 50. Outer wing 50 rotates around a spindle 80. A nut 140 retains spindle 80 within outer wing 50. An end plug 150 screws into outer wing 50 to securely hold in position the outer race of cartridge bearing 130, to reduce axial play between spindle 80 and outer wing 50. Once assembled, the inner wing 10, outer wing 50, spring 120, and sleeve 100 become a low cost four-sided clipless mechanism 280 and rotate about spindle 80 so that any of four sides of the mechanism are available for cleat 260 to clip into. Cleat 260 is attached to the bottom of a cycling shoe and will clip into pedal 180 by either stepping down into the clipping mechanism, or by sliding the shoe forwards or backwards over outer wing 50, causing all the parts except spindle 80 to rotate about one-quarter turn.

FIG. 1 is a perspective view of a stamped flat pattern 12 of the inner wing component of a low cost four-sided clipping mechanism of a clipless pedal. FIGS. 1–4 show conceptually the progression of forming the clipless mechanism components. FIG. 1 shows the first step in the stamping process. Stamped flat pattern 12 has holes 14 and 15 and an end with a tab 16 that will ultimately fit into a groove 18. Edges 28 and 29 are shown in the progressive stamping process to form these edges into radii that may fit better with the cleat 260 (shown in FIG. 6). For simplicity of explanation, this possible second step is not shown.

FIG. 2 is a perspective view of the stamped flat pattern 12 partially bent. FIG. 2 signifies the second step in the conceptual stamping process and bends 22, 23, 24, and 25 are partially bent.

FIG. 3 is a perspective view of the stamped pattern 12 bent to almost its final configuration. FIG. 3 signifies the third step in the conceptual stamping process and bends 22, 23, 24, and 25 are bent to their almost final state. Tab 16 is close to groove 18.

FIG. 4 is a perspective view of the stamped pattern bent completely and welded closed to form inner wing 10 of a low cost four-sided clipping mechanisms 270 and 280 (shown in FIGS. 9 and 10) of a clipless bicycle pedal. Tab 16 and groove 18 are welded together to form joint 26. Tab 16 and groove 18 are shaped in a complex or puzzle piece-like configuration to increase the surface area of the weld and to more accurately position the ends during welding Recesses 32 and 34 allow the ends of a spring 120 (shown in FIGS. 9–17) to fit within and permit the spring 120 to bias inner wing 10, as will be seen. After welding, plating or other surface finish can be added to inner wing 10 to improve corrosion resistance or improve aesthetics. As used herein, the term "welded" means any form of affixing metal to metal in a substantially permanent relation and includes brazing and soldering as well as welding.

FIG. 5 is a perspective view of a stamped, bent, and welded outer wing 40 component of the low cost four-sided clipping mechanism of a clipless bicycle pedal. Outer wing 40 is made using similar steps to the steps for making inner wing 10. Inner wing 10 fits within outer wing 40 in the four-sided clipless mechanism. Recesses 42 and 44 allow the ends of a spring 120 (shown in FIGS. 9–17) to fit within and permit the spring 120 to bias inner wing 10, as will be seen. After welding, plating or other surface finish can be added to outer wing 40 to improve corrosion resistance or improve aesthetics.

FIG. 6 is a perspective view of the progressive stamping stages plate 300 to form an inner wing 10. A roll of sheet metal 310 feeds into a progressive die. During the first stage 350, hole 320 and cutouts 340, 342, and 344 are punched out. Supports 330, 332, 334, and 336 remain for stability. During the second stage 360, holes 14 and 15 are punched out. During the third stage 370, edges 28 and 29 are pressed into radii. Holes 320, 322, and 324 are used for indexing sheet metal 310 through the progressive die. During the fourth stage 380, supports 336 and 330 are punched out, leaving tab 16 and groove 18. During the fifth stage 390, support 332 is punched out. During the sixth stage 400, bends 22 and 25 are made. During the seventh stage 410, bends 23 and 24 are made. During a separate process, tab 16 is welded to groove 18 to complete inner wing 10.

Figure 7:
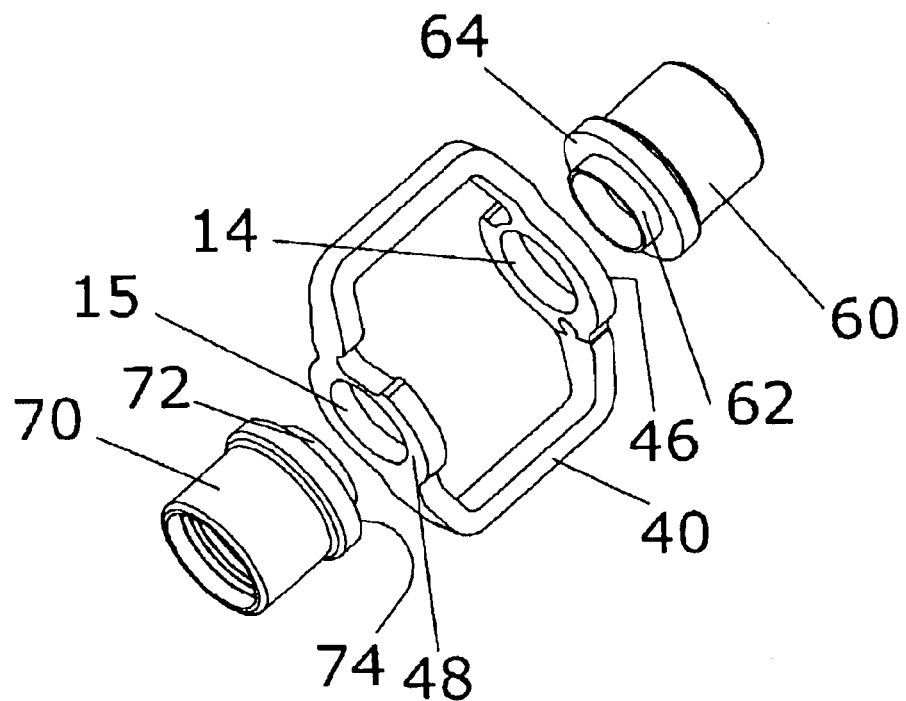
FIG. 7 is a perspective view of the outer wing component prior to being welded to an inboard Insert and an outboard insert.

FIG. 7 is a perspective view of the outer wing 40 component prior to being welded to inboard insert 60 and outboard insert 70. Inboard insert 60 is a screw-machined part that has a flange 62 and a surface 64. Outboard insert 70 is a screw-machined part that has a flange 72 and a surface 74. Screw-machined parts are relatively inexpensive to make because they can be automatically made on inexpensive screw machines, using automatically fed bars of material. Flange 62 fits inside of hole 14 of outer wing 40. Flange 72 fits inside of hole 15 of outer wing 40. Inboard insert 60 surface 64 is welded to outer wing 40 surface 46. Outboard insert 70 surface 74 is welded to outer wing 40 surface 48. Using a custom fixture, the welding can be done quickly, reliably and very inexpensively.

Figure 8:
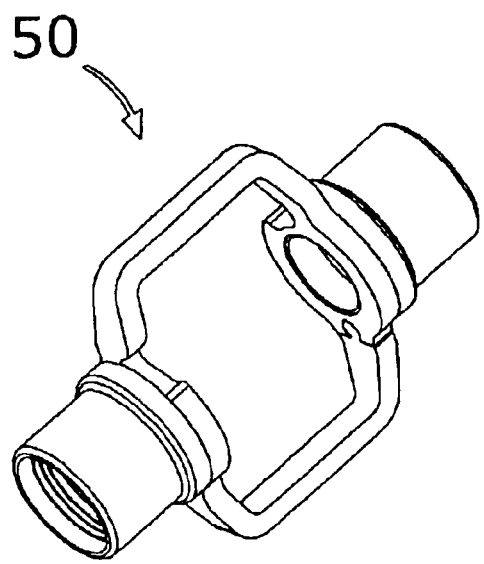
FIG. 8 is a perspective view of the outer wing component after being welded to the inboard and outboard inserts.

FIG. 8 is a perspective view of the outer wing 50. Outer wing 50 is created as described in FIG. 7. After welding, plating or other surface finish can be added to outer wing 50 to improve corrosion resistance or improve aesthetics.

Figure 9:
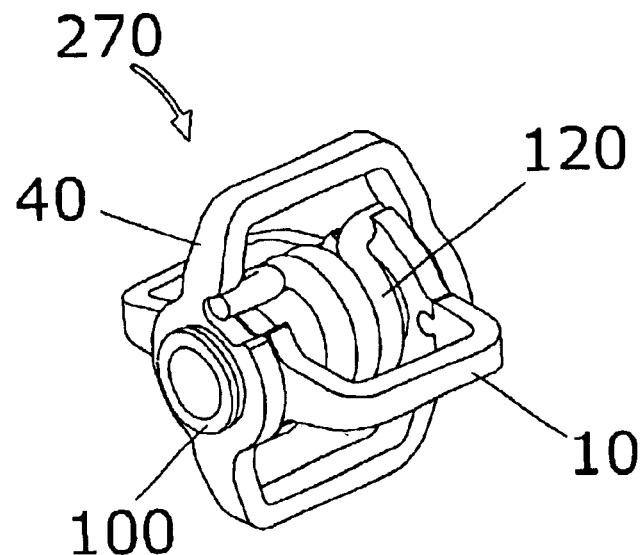
FIG. 9 is a perspective view of a low cost four-sided clipless mechanism for use in platform versions of clipless bicycle pedals.

FIG. 9 is a perspective view of a low cost four-sided clipless mechanism 270 for use in platform versions of clipless bicycle pedals. Mechanism 270 is comprised of an inner wing 10, an outer wing 40, a sleeve 100 and a spring 120. A cleat 260 (shown in FIG. 11) can clip into any of four sides of mechanism 270.

Figure 10:
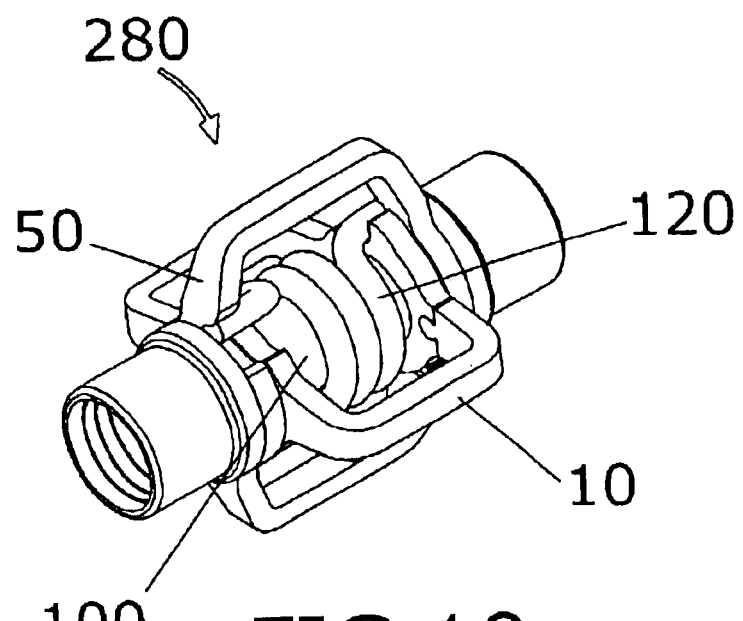
FIG. 10 is a perspective view of a low cost four-sided clipless mechanism for use in non-platform versions of clipless bicycle pedals.

FIG. 10 is a perspective view of a low cost four-sided clipless mechanism 280 for use in non-platform versions of clipless bicycle pedals. Mechanism 280 is comprised of an inner wing 10, an outer wing 50, a sleeve 100 and a spring 120. A cleat 260 (shown in FIG. 11) can clip into any of four sides of mechanism 270.

Figure 11:
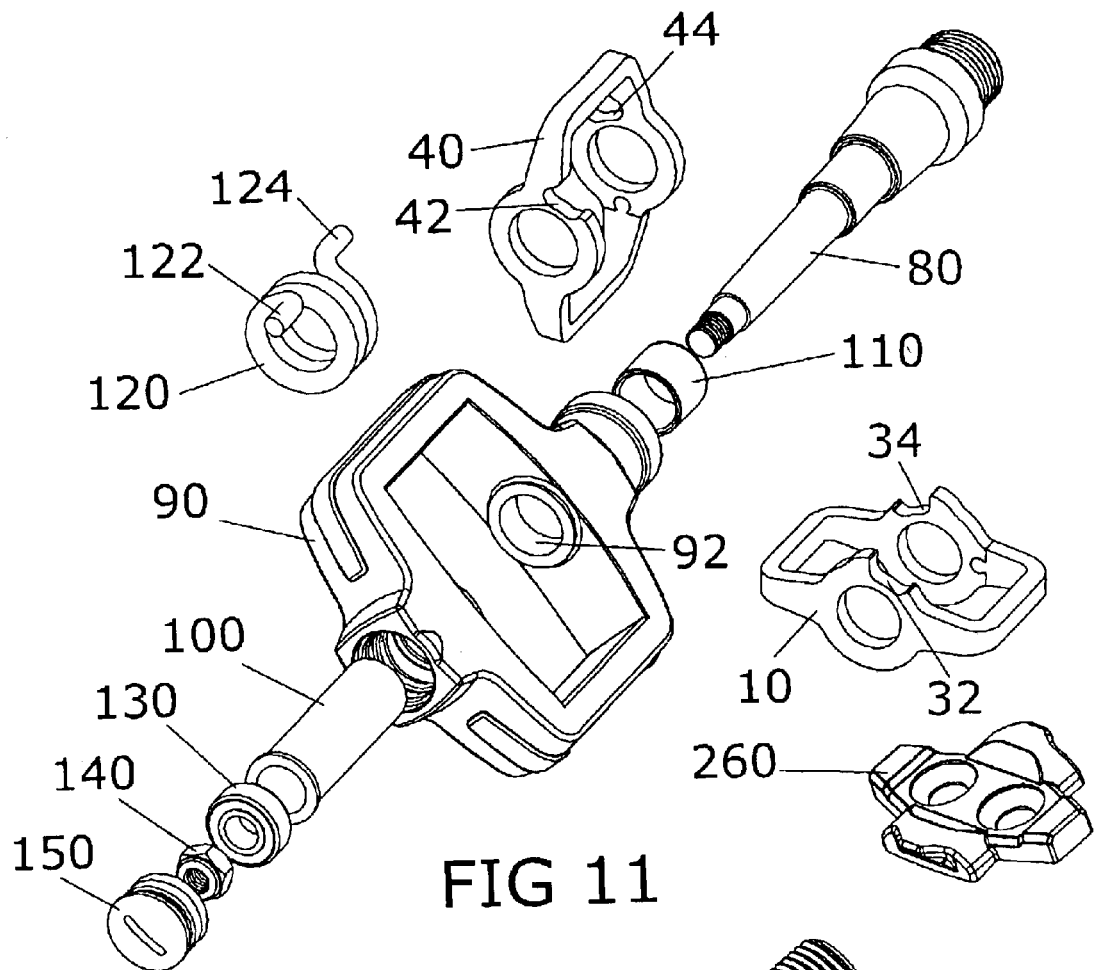
FIG. 11 is an exploded perspective view of a small platform version of a clipless pedal that uses the stamped and welded four-sided clipless mechanism.

FIG. 11 is an exploded perspective view of a small platform version 170 (shown in FIG. 12) of a clipless pedal that uses the low cost stamped and welded four-sided clipless mechanism 270. Pedal 170 is comprised of a spindle 80, a small platform 90, a cartridge ball bearing 130, a nut 140, an end plug 150 and mechanism 270. Mechanism 270 is comprised of an inner wing 10, an outer wing 40, a sleeve 100 and a spring 120. Platform 90 rotates about spindle 80 on bushing 110 and cartridge ball bearing 130. End plug 150 secures cartridge bearing 130 to platform 90. Nut 140 secures spindle 80 to cartridge bearing 130. Spring 120 end 122 will fit in recesses 32 and 42. Spring 120 end 124 will fit into recesses 34 and 44. Sleeve 100 can rotate within hole 92 of platform 90. After assembly, cleat 260 will clip into any of the four sides of mechanism 270. Not shown are rubber seals that may be used to keep the inner parts clean.

Figure 12:
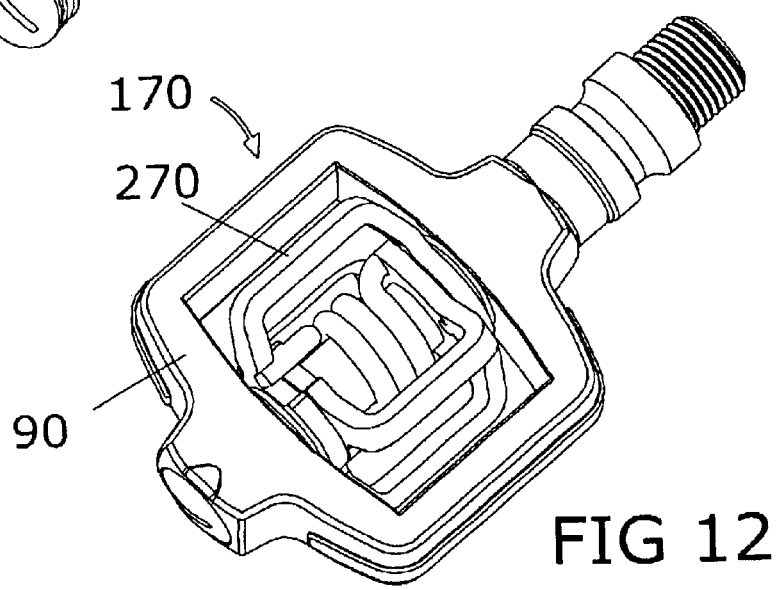
FIG. 12 is a perspective view of a small platform version of a clipless pedal that uses the stamped and welded four-sided clipless mechanism shown in FIG. 9.

FIG. 12 is a perspective view of a small platform version 170 of a clipless pedal that uses the stamped and welded four-sided clipless mechanism 270. Mechanism 270 can rotate within platform 90 so that any of four sides of the mechanism are available for cleat 260 to clip into.

Figure 13:
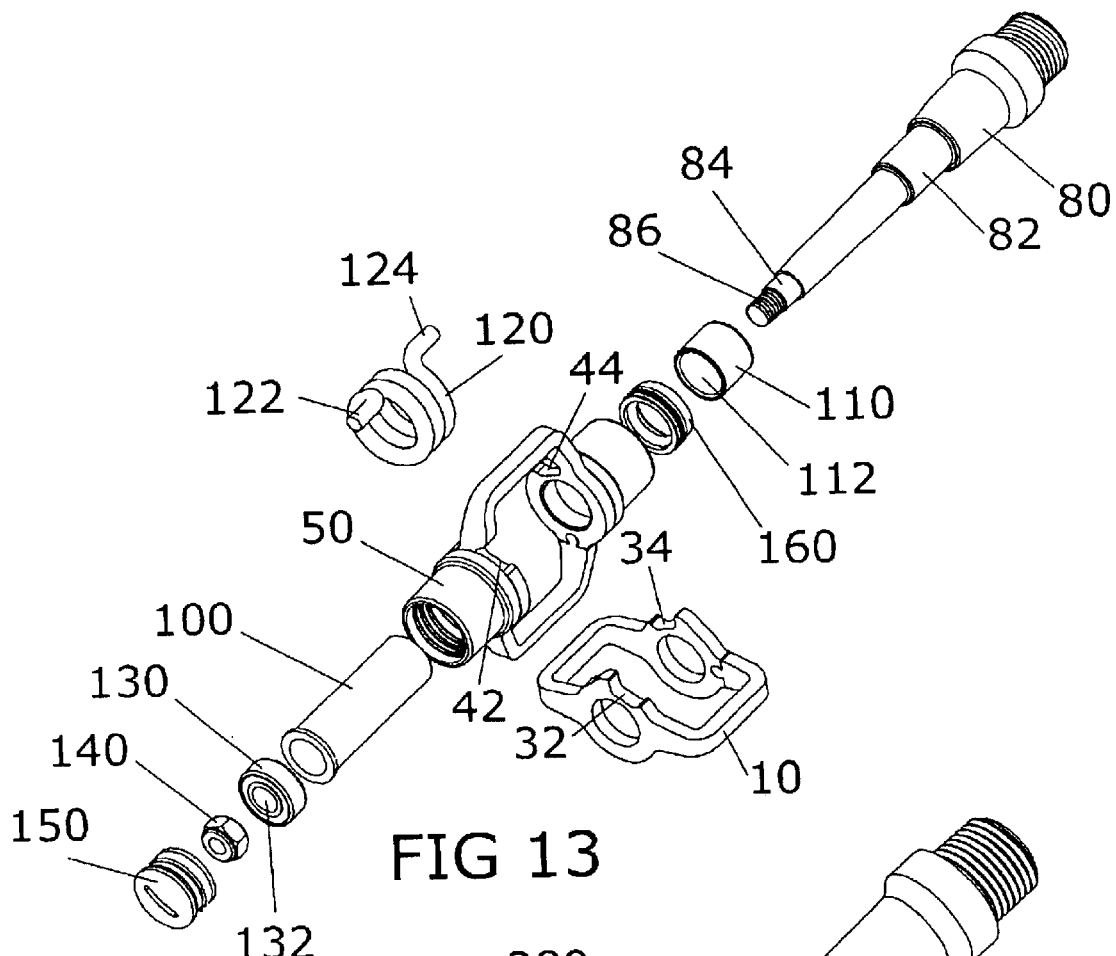
FIG. 13 is an exploded perspective view of a non-platform version of a clipless pedal that uses the stamped and welded four-sided clipless mechanism.

FIG. 13 is an exploded perspective view of a non-platform version 180 of a clipless pedal that uses the stamped and welded four-sided clipless mechanism 280. Pedal 180 is comprised of a spindle 80, a cartridge ball bearing 130, a nut 140, an end plug 150, a seal 160 and mechanism 280. Mechanism 280 is comprised of an inner wing 10, an outer wing 50, a sleeve 100 and a spring 120. Mechanism 280 rotates about spindle 80 on bushing 110 and cartridge ball bearing 130. End plug 150 secures cartridge ball bearing 130 to outer wing 50. Nut 140 secures spindle 80 to cartridge bearing 130. Spring 120 end 122 will fit in recesses 32 and 42. Spring 120 end 124 will fit into recesses 34 and 44. Spindle 80 surface 82 rotates within surface 112 of bushing 110 and surface 84 rotates within surface 132 of cartridge ball bearing 130. Not shown are additional rubber seals that may be used to keep the inner parts clean.

Figure 14:
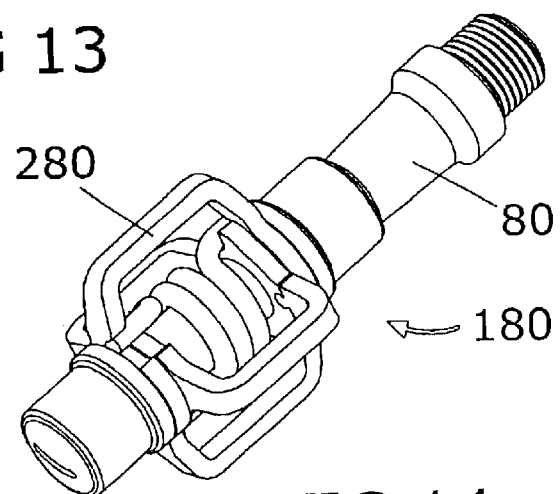
FIG. 14 is a perspective view of the assembled non-platform version of a clipless pedal that uses the stamped and welded four-sided clipless mechanism shown in FIG. 10.

FIG. 14 is a perspective view of the assembled non-platform version 180 of a clipless pedal that uses the stamped and welded four-sided clipless mechanism 280. The four-sided clipless mechanism 280 rotates about spindle 80 so that cleat 260 can clip into any of the four sides.

Figure 15:
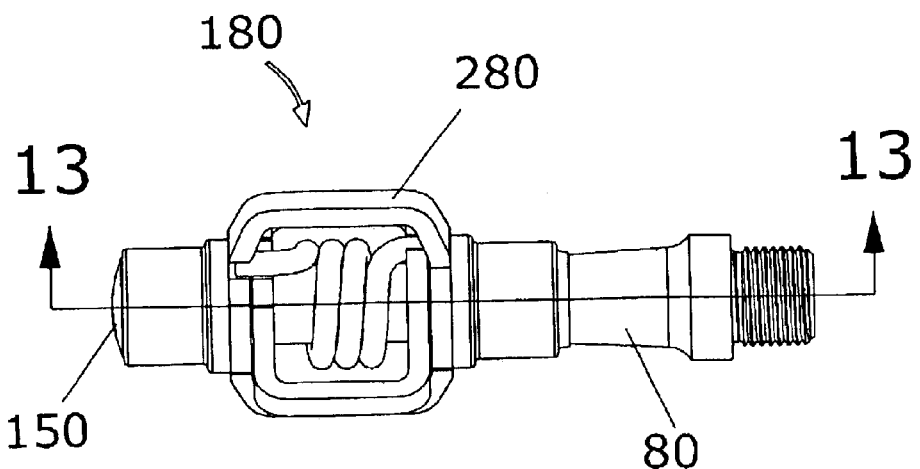
FIG. 15 is a side view of the non-platform version of a clipless pedal that uses the stamped and welded four-sided clipless mechanism shown in FIG. 10.

FIG. 15 is a side view of the non-platform version 180 of a clipless pedal that uses the stamped and welded four-sided clipless mechanism 280. Shown is mechanism 280, spindle 80 and end plug 150.

Figure 16:
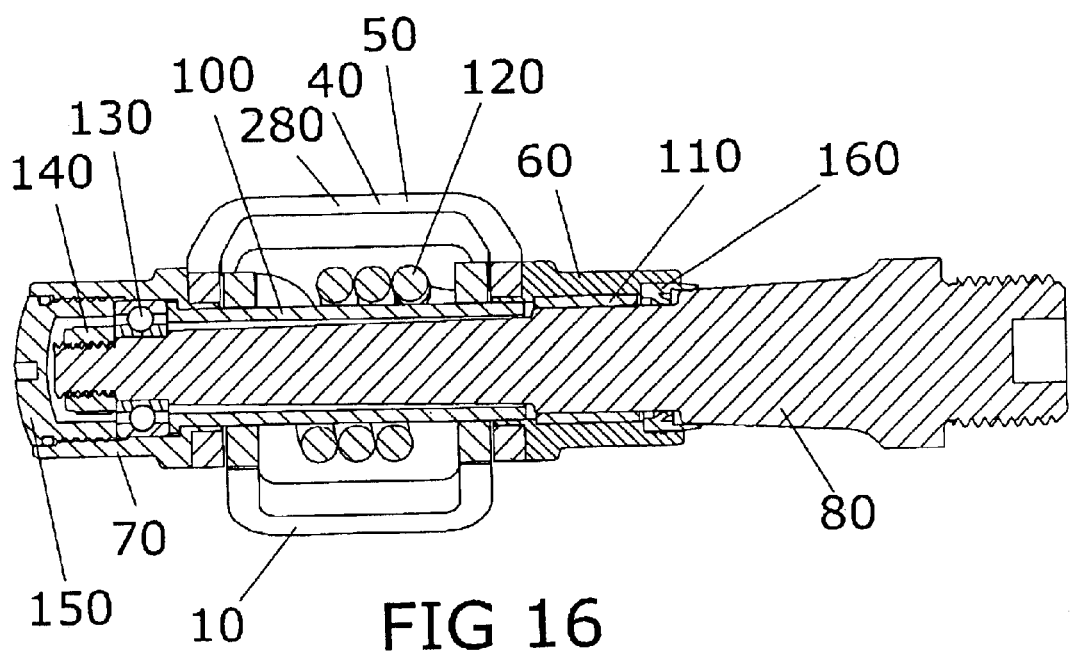
FIG. 16 is a cross sectional view of a non-platform version of a clipless bicycle pedal that uses the stamped and welded four-sided clipless mechanism shown in FIG. 15.

FIG. 16 is a cross sectional view of non-platform version 180 of a clipless pedal that uses the stamped and welded four-sided clipless mechanism 280 shown in FIG. 15. Pedal 180 is comprised of a spindle 80, a cartridge ball bearing 130, a nut 140, an end plug 150, a seal 160 and mechanism 280. Mechanism 280 is comprised of an inner wing 10, an outer wing 50, a sleeve 100 and a spring 120. Outer wing 50 is comprised of an outer wing 40 welded to inboard and outboard inserts 60 and 70, respectively. Mechanism 280 rotates about spindle 80 on bushing 110, and cartridge ball bearing 130. End plug 150 secures cartridge bearing 130 to Body 50. Nut 140 secures spindle 80 to cartridge bearing 130.

Figure 17:
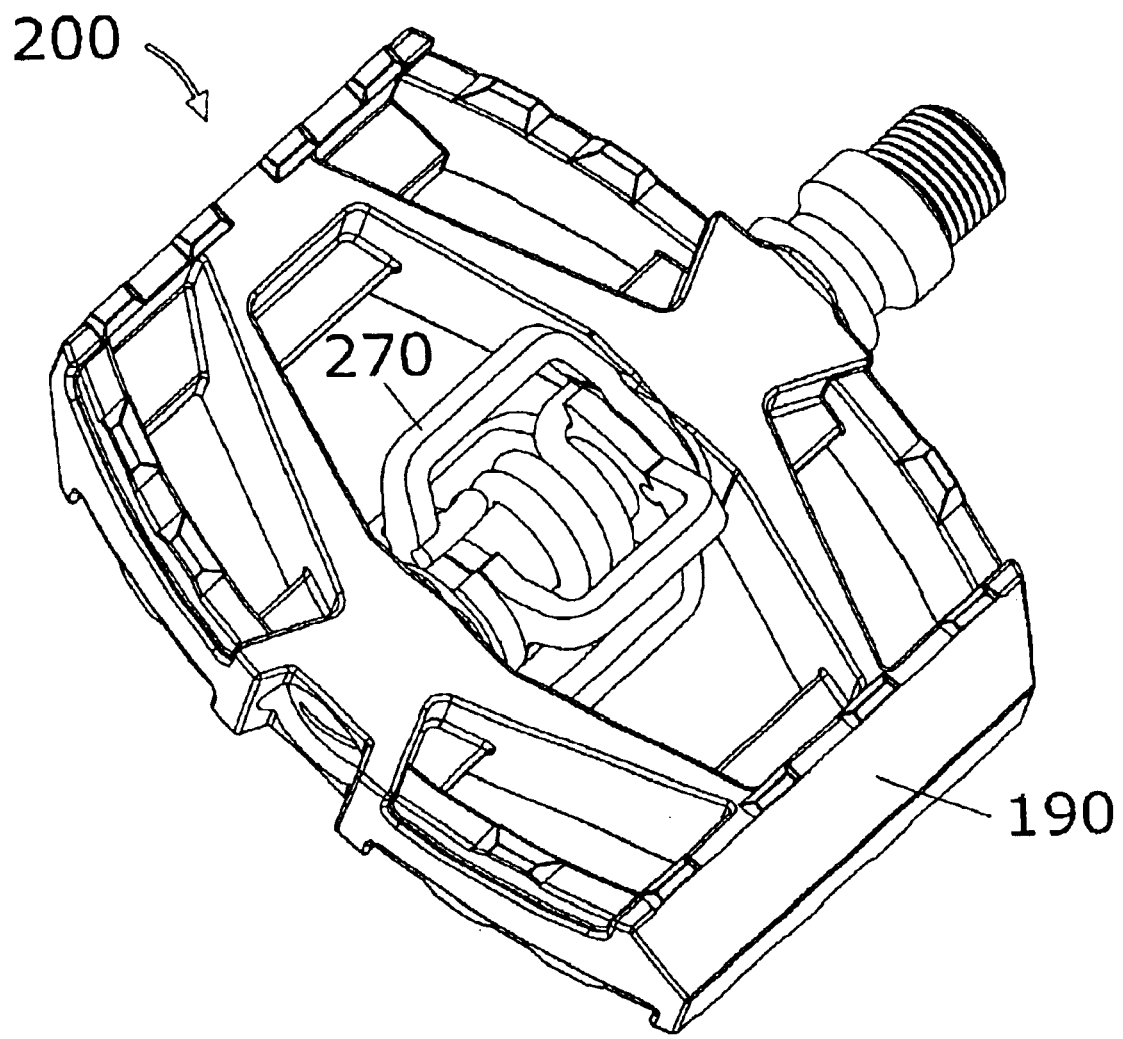
FIG. 17 is a perspective view of a large platform version of a clipless pedal that uses the stamped and welded four-sided clipless mechanism.

FIG. 17 is a perspective view of a large platform version 200 of a clipless bicycle pedal that uses the stamped and welded four-sided clipless mechanism 270. Mechanism 270 can rotate within platform 190 so that any of four sides of the mechanism are available for cleat 260 to clip into. Some bicyclists prefer a larger platform for better footing when not clipped into the pedal. This is especially true for so-called free-ride and downhill mountain bicyclers.

FIG. 18 is a perspective view of a prior art wing 210 of a prior art four-sided clipless bicycle pedal 240 (shown in FIG. 20). Inner wing 210 is made by investment casting (lost wax) steel. Inner wing 210 has recesses 232 and 234 that allow the ends of a spring 120 to fit within, and allow the spring 120 to bias inner wing 210.

FIG. 19 is a perspective view of a prior art outer wing 250 of a prior art four-sided clipless bicycle pedal. Outer wing 250 is made by investment casting (lost wax) steel. Outer wing 250 has stops 252 and 254 that fit against the ends of a spring 120 and allow the spring 120 to bias outer wing 250 against inner wing 210.

FIG. 20 is a perspective view of a prior art four-sided clipless bicycle pedal 240 made with the inner wing 210 and outer wing 250 from FIGS. 18 and 19, respectively. It is advantageous for spring 120 to be the same spring 120 used in pedals 170, 180, and 200 previously described. Spring 120 end 122 fits through inner wing 210 recess 232 and against outer wing 250 stop 252. Spring 120 end 124 fits through inner wing 210 recess 234 and against outer wing 250 stop 254. Spring 120 biases inner wing 210 to be orthogonal to outer wing 250, but allows cleat 260 to engage and disengage.

Having thus disclosed preferred embodiments of the present invention, it will thus be apparent that various modifications may be made to the explanary steps without departing from the advantageous features thereof. Accordingly, the scope of the invention is to be limited only by the claims appended hereto and their equivalents.

We claim:

1. A method of fabricating a clipless mechanism of a four-sided clipless bicycle pedal for mating with a rider's shoe cleat on any of four orthogonal pedal positions; the method comprising the steps of:

stamping flat inner and outer wing members, each such member having a pair of annular portions with respective spindle holes therethrough;

bending each such wing member into a substantially rectangular configuration with said respective spindle holes being coaxial with one another;

welding respective mating surfaces of each of said bent wing members to secure each wing member in its respective rectangular configuration;

placing said inner wing member and said outer wing member with respective spindle holes aligned along a common axis and respective rectangular configurations being substantially orthogonal to each other; and securing said inner and outer wing members to one another in resistive moveable nested relation about said common axis by installing within said rectangular configurations a helical spring having opposed ends engaging said wing members.

2. The method recited in claim 1 wherein said stamping step comprises the step of forming complex mating edges along said wing members to increase welding surface area.

3. The method recited in claim 1 wherein said stamping step comprises the step of forming recesses in said wing members for receiving said spring ends.

4. A method of fabricating a clipless mechanism of a four-sided clipless bicycle pedal for mating with a rider's shoe cleat on any of four orthogonal pedal positions; the method comprising the steps of:

stamping inner and outer wing members;

bending said wing members into respective circuitous configurations;

welding said wing members in their circuitous configurations;

placing said bent and welded wing members in a mutual orthogonal relation; and securing said inner and outer wing members to one another in resistive moveable relation.

5. The method recited in claim 4 wherein said stamping step comprises the step of forming complex mating edges along said wing members to increase welding surface area.

6. The method recited in claim 4 wherein said securing step comprises the step of installing a helical spring within said wing members, said spring having opposed ends engaging said wing members.

7. The method recited in claim 6 wherein said stamping step comprises the step of forming recesses in said wing members for receiving said spring ends.

8. A method of fabricating a clipless mechanism of a device for mating with a user's shoe cleat on any of a plurality of orthogonal positions; the method comprising the steps of:

stamping out two cleat engaging members of substantially elongated configuration;

bending said cleat engaging members into two respective substantially circuitous members and welding them closed;

placing said circuitous members into a juxtaposed orthogonal relationship about a common axis of rotation; and securing said circuitous members into said orthogonal relationship allowing a limited resistive relative movement therebetween about said axis.

9. The method recited in claim 8 wherein said securing step comprises the step of installing a helical spring within said circuitous members, said spring having opposed ends engaging said rectangular members.

* * * * *